US005533251A

United States Patent [19]
Vetter

[11] Patent Number: 5,533,251
[45] Date of Patent: Jul. 9, 1996

[54] AUTOMATIC HAIRPINLACING APPARATUS

[76] Inventor: Klaus-Dieter Vetter, 1755 Maple Ave., Croydon, Pa. 19020

[21] Appl. No.: 457,496

[22] Filed: Jun. 1, 1995

Related U.S. Application Data

[62] Division of Ser. No. 63,535, May 18, 1993, Pat. No. 5,442,853.

[51] Int. Cl.⁶ ..................................................... B23P 15/26
[52] U.S. Cl. ................. 29/727; 29/890.043; 29/890.047; 29/726
[58] Field of Search ........................ 29/726, 727, 33 G, 29/33 T, 890.043, 890.047

[56] References Cited

U.S. PATENT DOCUMENTS

| | | |
|---|---|---|
| 4,519,121 | 5/1985 | Yokosawa . |
| 4,601,088 | 7/1986 | Kopezynski . |
| 4,734,969 | 4/1988 | Currier et al. . |
| 4,839,950 | 6/1989 | Stroup . |
| 5,154,679 | 10/1992 | Fuller et al. . |

*Primary Examiner*—Irene Cuda
*Attorney, Agent, or Firm*—Gregory J. Gore

[57] ABSTRACT

An apparatus for the automatic lacing (drawing) of hairpin tubes through the holes of a heat exchanger fin stack is provided. This apparatus includes a plurality of identical extendable guide rods, each positioned in approximate alignment to engage an open end of a respective heat exchanger tube which is positioned adjacent to a respective fin stack hole. The plurality of guide rods are extended in unison through the holes of the heat exchanger fin stack to positions within the open ends of the hairpin tubes. A self aligning knurl structure on each guide rod lead end is expanded to engage the respective I.D. of a respective hairpin tube. The guide rods are then retracted in unison pulling the tubes through the fin stack holes. A self regulating pressure mechanism assures that the pressure exerted by an expanding knurl end is within a predetermined range. Once the tubes have been laced, the knurl structures are collapsed and the guide rods withdraw from the tubes.

14 Claims, 5 Drawing Sheets

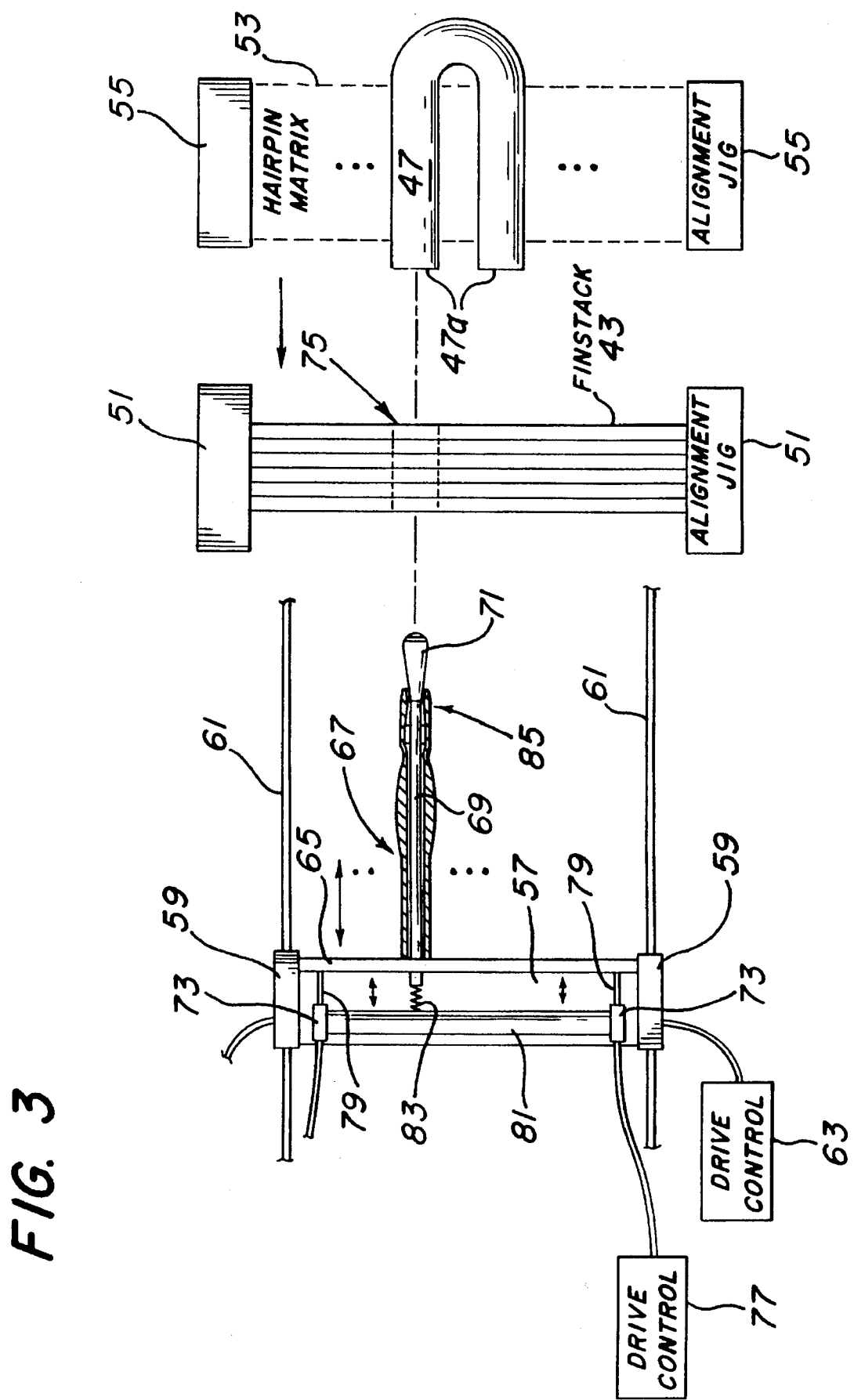

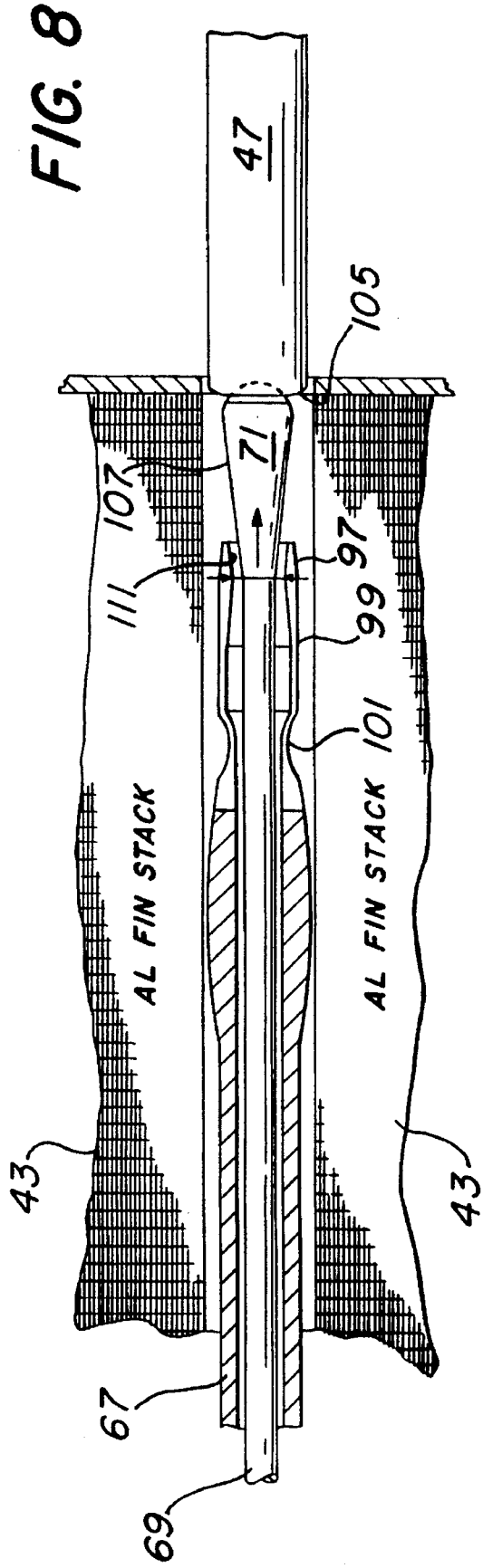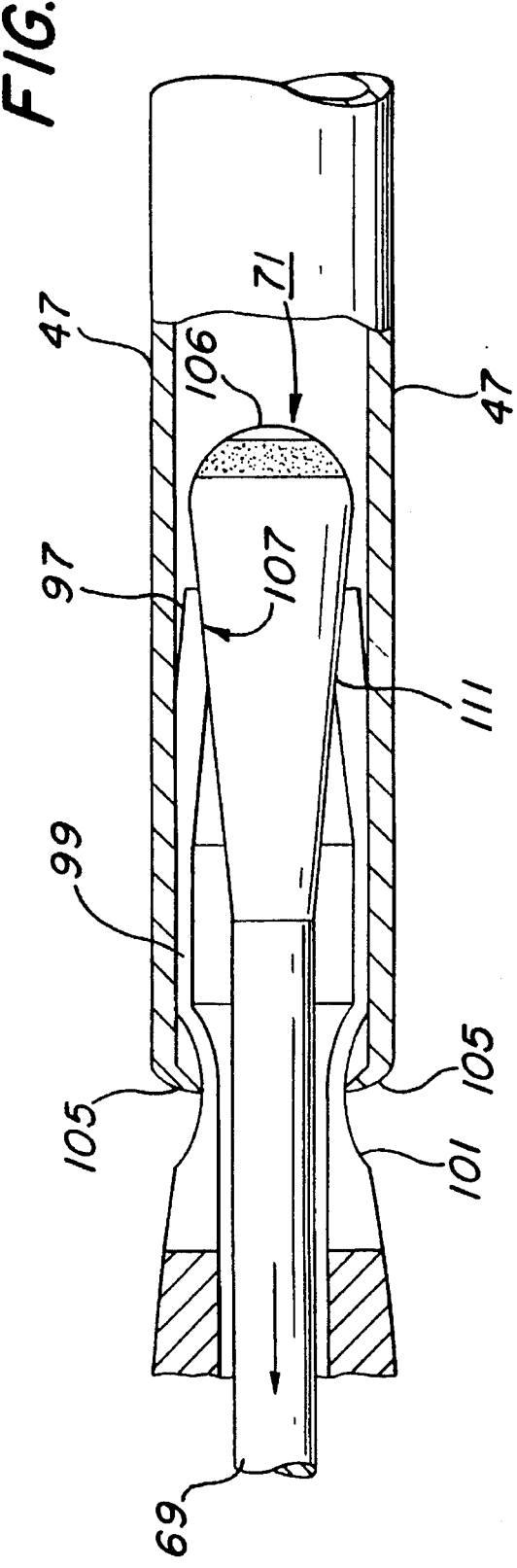

AUTOMATIC HAIRPINLACING APPARATUS

This application is a division of application Ser. No. 08/063,535, filed on May 18, 1993, now U.S. Pat. No. 5,442,853.

BACKGROUND OF THE INVENTION

The present invention relates to the "hairpin" lacing process portion of the manufacture of heat exchangers and an apparatus used for automatic hairpin lacing. In particular it relates to the apparatus and process of automatically drawing/inserting copper or aluminum or other suitable material cooling tubes through a stack of thin, pliable aluminum fins which have been punched for receiving said cooling tubes.

Heat exchangers have many uses in industry and commerce. Large numbers of them are used in the automotive industry for radiators, oil coolers, and air conditioning heat exchangers.

The generally accepted construction for such heat exchangers includes a plurality of spaced, parallel, longitudinally extending first fluid carrying tubes. A plurality of spaced, heat transfer "fins" are mounted on these fluid carrying tubes and are surrounded by a second fluid medium.

With automotive heat exchangers, the first fluid carrying tubes are generally of copper or aluminum or other suitable material and the heat transfer fins are soft, pliable, and thin aluminum sheet material.

The manufacturing process for such heat exchangers has been automated to some extent. However, one portion of this manufacturing process which has remained manual, and therefore labor intensive and slow, has been the lacing of the heat exchanger tubes through holes punched through the fins.

Efforts have been partially made to automate the assembly process for these heat exchangers. In this regard, a plurality of fins are cut and assembled into a "stack". This stack is then machine punched for the intended pattern of the tubes.

As the tubes are to serpentine back and forth through the fin stack, assembly has been further partially automated by first joining pairs of parallel extending tubes with elbows (return tubes) to form a "hairpin". These hairpins are then gently inserted through an adjacent pair of holes in the fin stack by an assembly operator.

After all of the tubes have been inserted through the fin stack, from a first side of the stack, the hairpin tubes are expanded to fit tightly within the fin stack and the opposite side return bends are connected to the tubes.

Previous attempts to automate hairpin lacing have proved unsuccessful as there has been no apparatus developed which can lace the tubes through the punched holes in the stack of fragile fins without either elongating the punched holes or bending or otherwise distorting the fins.

It is necessary to draw the tubes through the fins in a noise and vibration empounded environment without distorting the fins or the punched holes therethrough, beyond the tolerances specified for the expanding apparatus, which later expands the tubes to fit tightly against the fins.

It is desirable to provide an uncomplicated, reliable, accurate apparatus for automatically drawing the heat exchanger hairpins through the prepunched holes of a fin stack.

SUMMARY OF THE INVENTION

An object of the present invention is to provide an apparatus and a process for the automatic lacing (drawing) of hairpin tubes through the punched holes of a heat exchanger fin stack without disturbing (elongating) those punched holes, without bending the fragile fins, and without binding the tubes.

A second object is to provide such an apparatus which includes hairpin tube engagement structure which is uncomplicated and reliable, and which compensates for minor misalignments.

A further object is to provide such an apparatus with a self regulated engagement pressure.

The objects of the present invention are realized in an automatic hairpinlacing process and an apparatus for performing this process. In the manufacturing of heat exchangers, heat radiating fin sheets are stacked, hole punched and then clamped. A plurality of tubing hairpins, assembled in a matrix, are then aligned with the fin stack holes with their open ends juxtaposed to these punched holes.

A matrix of the hairpin tube engaging guide rods is then extended through the fin stack holes. Each guide rod carries a self aligning expandable end structure. The expansion pressure of each expandable end structure is individually regulated.

Once the matrix engaging guide rods are positioned within the matrix of hairpin tube open ends, the expandable end structures are expanded to engage the inside walls of the hairpin tubes. After the hairpin tubes are engaged, the matrix of guide rods are retracted to pull (lace) the hairpin tubes through the fin stack.

The automatic hairpin lacing structure has first and second individually operated drives. A mounting block which carries the matrix tube engaging guide rods is moved in a predetermined manner by the first drive.

Each tube engaging guide rod is a tubular structure which has an expandable end with a self aligning tapered profile. This expandable end includes a plurality of radially positioned and longitudinally extending expander fingers.

Positioned concentrically within each tubular guide rod is an expander rod having a tapered expander tip operating in the region of the expander fingers. Each expander finger on a tubular guide rod includes a spring portion, an expander tube mating portion, and a tube engagement tapered portion.

An expander rod movement compensator spring is connected between each expander rod and the second drive. This compensator spring operates as a pressure regulator or self adjusting pressure mechanism, with respect to the force exerted by the expander tip on the radially moveable expander fingers. The expander fingers comprise an expanding knurl structure for engaging and pulling against the I.D. of a tube.

Once the matrix of tubes is engaged by the matrix of expanded fingers, the first drive which carries the second drive retracts the structure to lace (pull) the tubes through the fin stack.

The first and second drives are operated first individually, then together, then individually to effect the extension, engagement, retraction/lacing, and release steps.

DESCRIPTION OF THE DRAWINGS

The features, advantages, and operation of the present invention will be better understood from a reading of the following Detailed Description of the Invention, in conjunction with the following drawings, in which like numerals refer to like elements and in which:

FIG. 3 is a plan view of the apparatus of the present invention for hairpinlacing, showing a tube engaging guide rod in cross section;

FIG. 8 is a partial sectional view of a single tube engaging guide rod extending through a fin stack hole to engage a hairpin tube; and FIG. 9 is a partial sectional view of a single tube engaging guide rod expander fingers in engagement to pull (lace) a hairpin tube.

DETAILED DESCRIPTION OF THE INVENTION

Figure 1:
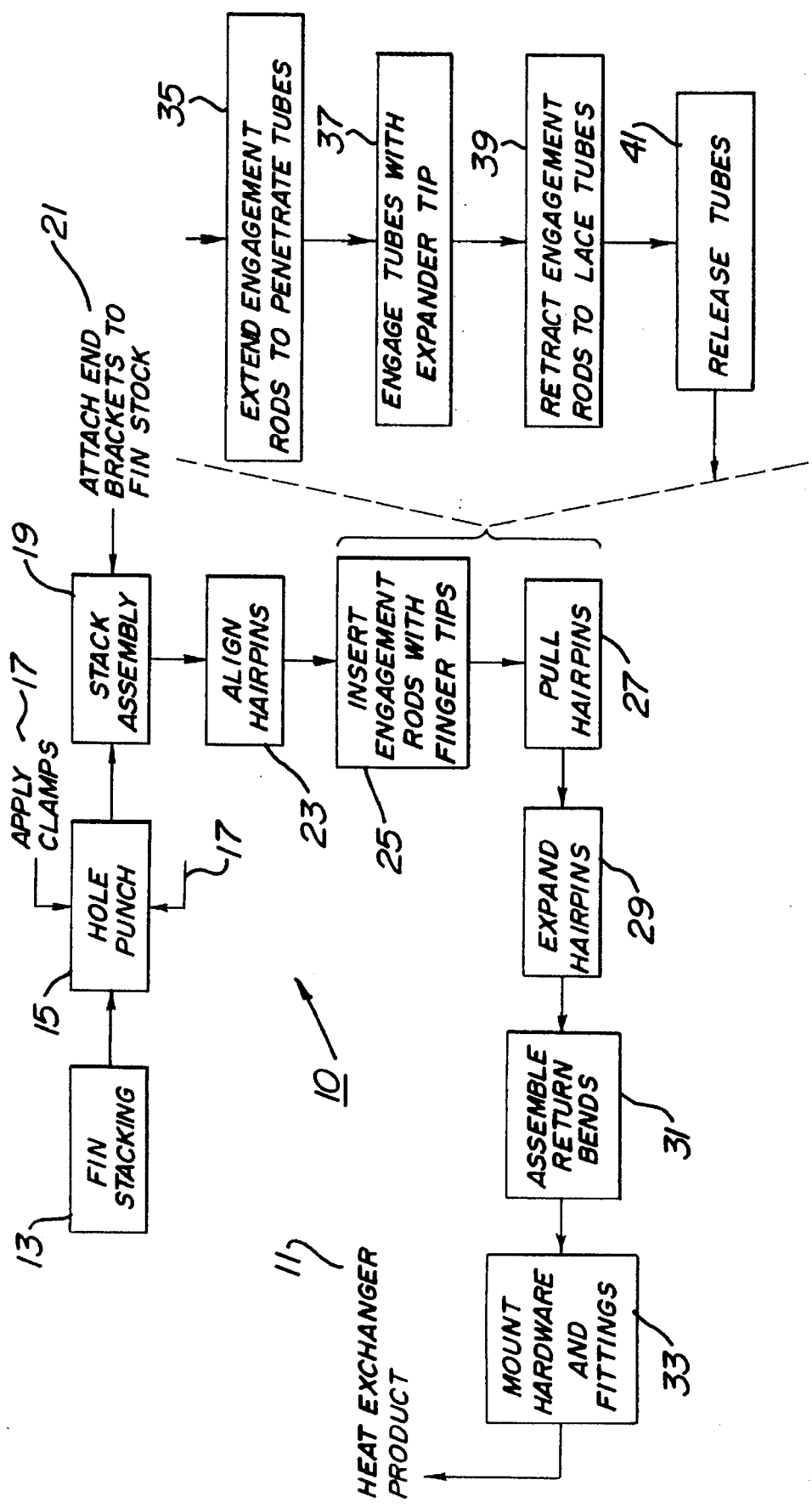
FIG. 1 is a block diagram of the manufacturing process for a heat exchanger product showing the steps of the automatic hairpinlacing process of the present invention.

An automatic hairpinlacing process is carried out as part of the manufacturing process (10), FIG. 1, for a heat exchanger product (11). This heat exchanger product (11) is made by first stacking a plurality of heat transfer fins, step (13), and then punching a plurality of holes (15) through this stack to receive a plurality of fluid (liquid or gas) carrying tubes, commonly called hairpin tubes.

The hole punched, fin stack is held together by clamps (17) and then further assembled (19), including the attachment of end brackets to the fin stack (21).

A matrix of hairpin tubes is aligned (23) with the fin stack hole matrix. This fin stack hole matrix has been aligned with the automated hairpinlacing apparatus.

Thereafter extendable engagement rods, which engage the hairpin ends, are inserted (25) through the fin stack holes. This structure engages the hairpin tubes open ends and pulls (27) the hairpin through the fin stack.

Thereafter the hairpins are expanded (29) to fit tightly against the fin stack holes and the return bends are assembled (31) on the hairpin ends.

The remaining hardware and fittings are assembled (33) onto the heat exchanger to produce the heat exchanger product (11).

The insertion step (25) and pulling (lacing) step (27) are implemented by the following steps. First, the engagement rods are extended (35). Then the ends of these rods expand to engage the hairpin tubes (37). Thereafter, the engagement rods are retracted (39) to pull the hairpin tubes through the fin stack holes. Finally, the engagement rods are released (41) from the tubes.

Figure 2:
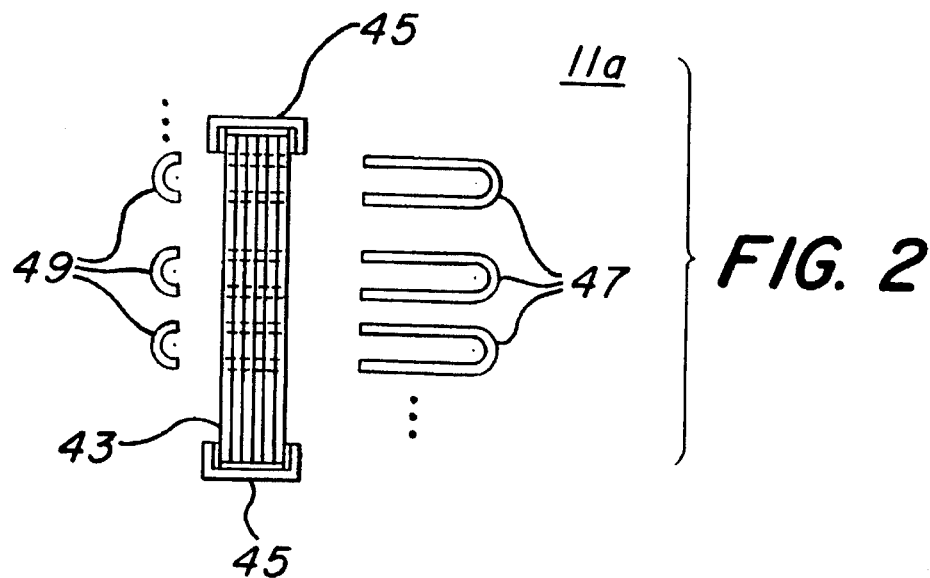
FIG. 2 is an expanded side view of a partially assembled heat exchanger showing the fin stack, hairpins, and return bends.

A partially assembled heat exchanger product (11a) is shown in partially expanded view in FIG. 2. The fin stack (43) is held together by clamps and end brackets (45) and is prepunched to receive a plurality of hairpin tubing subassemblies (47) which are mated to return elbows (49).

The process steps (23), (25) and (27) of FIG. 1 are carried out by the structure shown in FIG. 3. These process steps include the process steps (35), (37), (39) and (41) of FIG. 1.

The structure shown in FIG. 3 includes the fin stack (43) which has been prepunched to a desired hole pattern and mounted in a fin stack alignment jig (51). The matrix (53) of preassembled hairpin (47) elements are held in position by a second, or hairpin matrix alignment jig (55). This second jig (55) is moved toward the fin stack (43) so that the hairpin (47) open ends (47a) are adjacent to the respective punched holes in the fin stack (43).

The apparatus includes a base (57) which is generally mounted or positioned to operate parallel to the operating floor of the assembly area. This base (57) is moved forward toward, and retracted from, the fin stack (43) by means of a first drive unit (59). The first drive unit (59) operates upon guide rails (61) so that its orientation is predetermined, as it approaches the fin stack (43) or is withdrawn from the fin stack (43).

The first drive (59) is controlled by a first drive controller unit (63). This drive controller unit can have a mechanical timing, cam or it can be hydraulic valve operated or electronically operated.

Rising from the base (57), at its face position adjacent to the fin stack (43), is a mounting block (65). This mounting block or mandrel (65) carries a plurality of tube engaging tubular guide rods (engagement rods) (67). These tubular guide rods (67) are of a number and assembled in a matrix necessary to engage the respective holes (75) punched through the fin stack (43) and thereby engage the respective open ends (47a) of the hairpins (47).

Positioned longitudinally within each tubular guide rod (67) is an operating expander rod (69). Located at the leading end of each expander rod (69) is a tapered expander tip (71).

A second drive (73) is mounted to operate on the base (57) in the same longitudinal direction as the first drive (59). That is to say, the first and second drives (59,73) act to form a two stage movement structure for movement of respectively mounted members towards and away from the fin stack (43), in alignment with the respective punched holes (75). The second drive (73) is connected to and controlled by a second drive controller unit (77) which operates upon its own set of guide rails (79) mounted to the base (57).

Positioned on and carried by the second drive (73) is an expander drive block (81). This expander drive block or mandrel (81) extends parallel to the mounting block (65) and operates on the side of said mounting block (65) away from the fin stack (43).

While the tubular guide rods (67) are mounted on and permanently attached to the mounting block (65), the expander rods (69), which operate within the tubular interior of the guide rods (67), are connected to expander drive block (81) by a compensator drive spring (83).

Each tube engaging tubular guide rod (67) carries a knurled expander end which includes a plurality of radial positioned expander fingers (85). This expander end will be described in greater detail below.

The first drive controller (63) operates to have the first drive (59) advance and retract the base (57) from the jig (51)

position of the fin stack (43). When the first drive (59) is advancing the structure toward the fin stack (43), the expander fingers (85) are relaxed and the expander rod (69) is advanced so that the tapered expander tip (71) extends beyond the expander fingers (85). In order for this to exist, the second drive controller (77) must have advanced the second drive (73) toward the mounting block (65).

Once each tubular guide rod (67) has advanced through its respective punched hole (75) to engage the hairpin open end (47a), the advancing motion of the first drive (59) is stopped. Thereafter, the second drive withdraws from the mounting block (65) position thereby carrying the expander rod (69) and its respective expander tip (71) down the length of the tubular guide rod (67) to have the expander tip (71) engage the plurality of expander fingers (85).

Once the desired extension movement is completed, the second drive (73) stops its retracting movement. Thereafter, the second drive (73) is operated to withdraw the entire assembly including the base (57), mounting block (65) and its matrix of guide rods (67) away from the fin stack alignment jig (51) thereby pulling the hairpins (47) out of the hairpin matrix (53) and lacing them through respective holes (75) in the fin stack (43).

Upon completion of the lacing operation, the second drive (73) is operated to move the expander drive block (81) toward the mounting block (65), thereby extending the expander rod (69) and its respective expander tip (71) and releasing the expanded position of the fingers (85). This first drive (59) is thereafter operated to further withdraw the entire assembly from the fin stack alignment jig area so that the further steps in the heat exchanger product (11) manufacturing process may be carried out.

Figure 4:
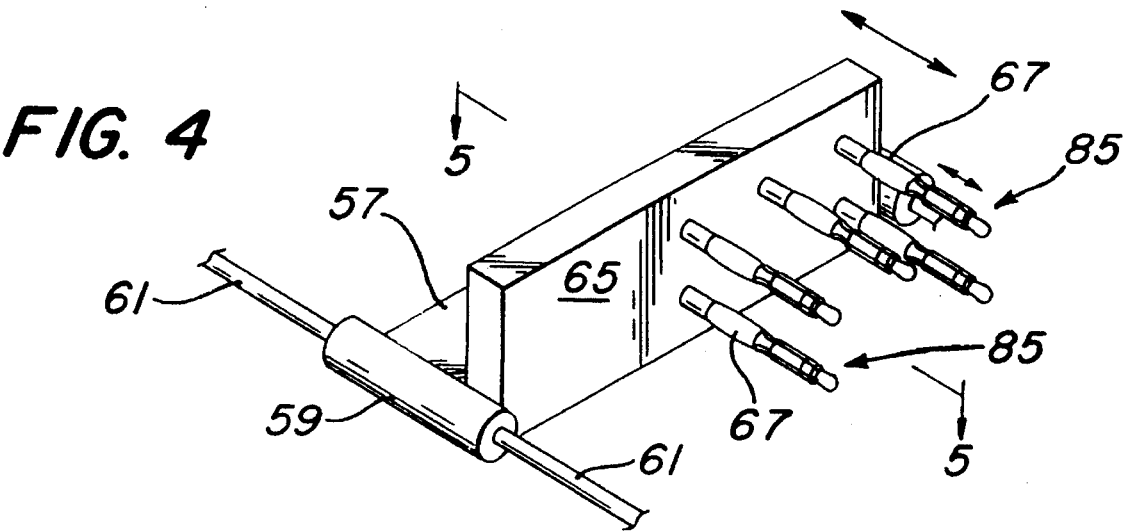
FIG. 4 is a perspective view of the mounting block, partial matrix of tube engaging guide rods, and first drive unit of the present invention.

The first drive (59), its guide rails (61), and the mounting block (65) carrying the matrix of tubular guide rods (67) are shown in perspective view in FIG. 4. The expander finger portion (85) of each guide rod (67) is also shown. The expander fingers (85) are in the collapsed or unexpanded position and the tapered expander tip (71) is not shown.

Figure 5:
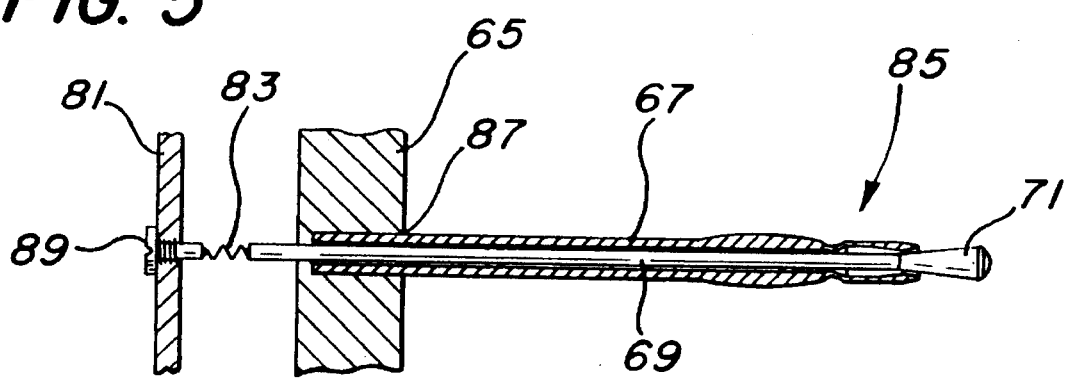
FIG. 5 is an expanded view, in partial cross section, of a single tube engaging guide rod, expander rod and tip, mounting block, expander drive block, and compensating spring of the present invention, taken as shown in FIG. 4.

The mounting block (65), FIG. 5, has been pre-drilled in the hole pattern of the guide rod (67) matrix. Each guide rod (67) is positioned in its respective receiving hole (87). While these guide rods (67) may be welded or otherwise permanently fastened in their receiving holes (87), it is preferred that they be fixedly removable. This can be accomplished by a tapered fit or by tapping and threading.

The expander rod (69) operates freely within the cylindrical interior of a tubular guide rod (67) under the force exerted by the expander drive block (81) through the compensator drive spring (83). The compensator drive spring (83) can be any number of configurations including a leaf spring, a folding flat spring, a helical spring, and a coil spring. This compensator drive spring (83) can be either a linear drive spring or a variable rate drive spring.

A securement screw (89) is mounted through the expander drive block (81) for each compensator drive spring (83), and is positioned in alignment with the operating axis of the expander rod (69). The compensator drive spring (63) is attached between its respective securement screw (89) and its respective expander rod (69). This attachment can be by welding, pin attachment, clamping, or other suitable means.

Figure 6:
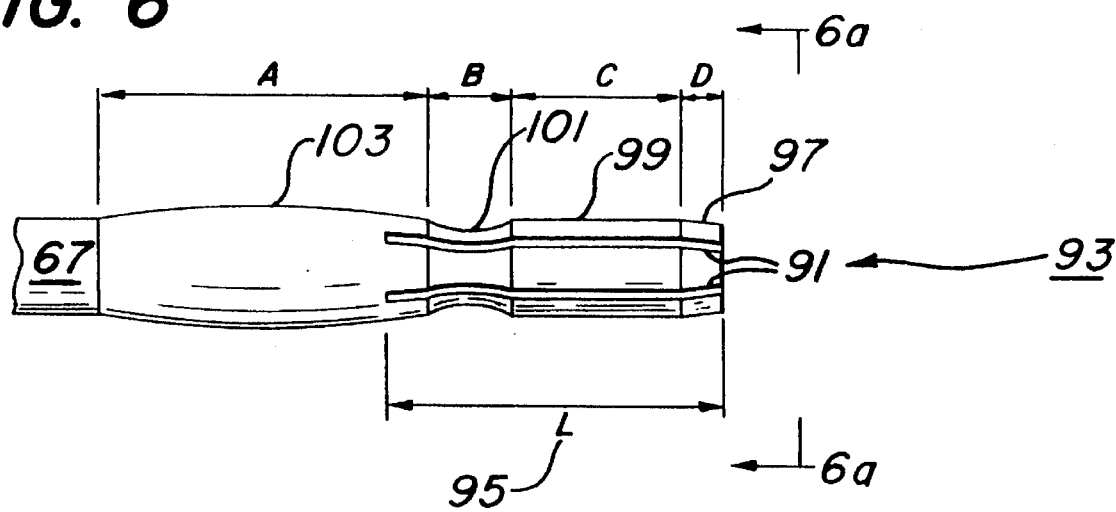
FIG. 6 is a plan view of the expanding end of a tube engaging guide rod of the present invention.
Figure 6A:
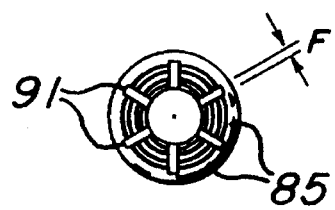
FIG. 6a is an end view of the rod taken as shown in FIG. 6.

The hairpin opening (47a) engagement end of a tubular guide rod (67) is shown in a plan view in FIG. 6. A plurality of longitudinal slots (91) extend from the engaging end (93) of a guide rod (67). The slot length (95) will vary as a function of the materials used for the fin stack (43) and the materials used for the hairpins (47). The pulling pressure, i.e., the lacing pressure, will also have a bearing on slot length (95). The number of slots (91) cut radially in the engagement pin (93) is shown in FIG. 6a. Here, six slots (91) create six expanding fingers (85). Of course, as the inner profile of each hairpin (47) tube is circular, the profile of the guide rod (67) is circular. Therefore, by having more expanding fingers (85), greater surface contact of these fingers (85) can be obtained against the I.D. of a hairpin (47) tube. The trade off being that the more fingers (85) there are the narrower each finger (85) is and the weaker the metal structure for each finger (85) becomes, i.e., the more delicate is each finger.

In referring back to FIG. 6, the engagement end of a tubular guide rod (67) has an aligning tapered length portion (97) at its lead end. Extending backwardly therefrom is a tube engagement portion (99) which in the resting or unexpanded position extends generally parallel to the longitudinal axis of the tubular guide rod (67).

Adjacent to this tube engagement portion (99) is a spring portion (101) which is created by an annular indentation which is normal to the longitudinal axis of the tubular guide rod (67). This spring portion (101), with its annular indentation, creates a narrower wall thickness for the guide rod (67) at that portion (101).

Positioned adjacent to the spring portion (101) and further removed from the engagement end (93) is an alignment knurl (103) which is created by a guide rod (67) wall protrusion of parabolic shape. The arc of this alignment knurl (103) is dictated by the tolerances in size between a punched stack hole (75), the hairpin (47) tubing size, and the O.D. of the tubular guide rod (67).

Figure 7:
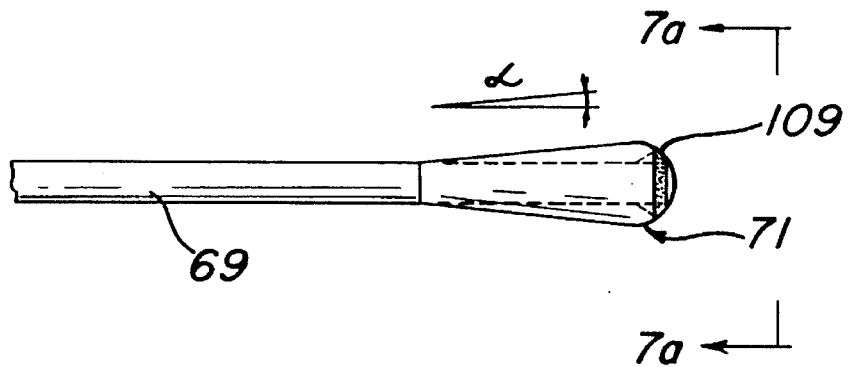
FIG. 7 is a side view of an expander rod and tip of the present invention.

The expander rod (69) is shown in side elevation in FIG. 7 with the expander tip (71) mounted thereon. The expander tip's (71) leading edge (106) is round and its base is a generally truncated conical shape (107) leading backwardly from the round leading edge. The expander tip (71) has been drilled to receive the expander rod (69) and can be mounted on this rod (69) by pinning it thereto with the flush pin (109).

Figure 7A:
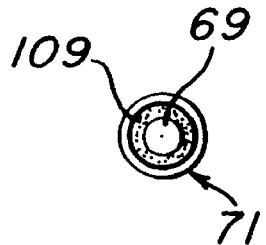
FIG. 7a is a longitudinal view of the expander rod and tip taken as shown in FIG. 7.

A longitudinal view of the expander rod (69) and the tip (71), FIG. 7a, shows them to be in concentric longitudinal alignment. The tapered angle of the truncated conical surface (107) of the expander tip (71) can be of a range from 5 degrees to 45 degrees, and in the present embodiment is approximately 12 degrees.

Other structures can be used for this expander tip (71) conical surface (107). However, the conical surface (107) eliminates any alignment problems when the expander tip (71) is operating upon the expander fingers (85).

The aluminum fin stack (43) has been penetrated, FIG. 8, by the engagement subassembly to a position to engage the hairpin tube (47). The open end (47a) of a hairpin tube (47) generally will carry a crimp or burr (105) from the parting off operation. A leading edge finger (85) tube engagement taper length (96) will allow the finger (85) to flex inwardly slightly to penetrate the open end (47a) and pass the crimp (105).

When a sufficient length of the engagement portion (99) has passed the crimp (105), the insertion of the assembly is stopped, FIG. 9. The expander rod (69) and its expander tip (71) are then retracted to expand the fingers (85) against the tube (47).

The leading end of each finger (85) includes an inwardly tapered build up (109). This build up (109) forms an inwardly tapering camming surface (111) of conical shape. The tapering angle of this camming surface (111) is similar and preferably identical to the angle of the tapered camming surface (107,) of the expander tip (71). The operation of camming surface (107) against camming surface (111) forces the expander fingers (85) to move radially outwardly so that the respective tube engagement portions (99) engage the inside walls of the hairpin tube (47). Once this has been done with sufficient force to pull the tube (47) but not so considerable as to distort its shape or size, the entire assembly is retracted, as stated above, to lace the hairpin (47) through the fin stack (43).

During the penetration of the tube (47), the round leading edge (106) of the expander tip assists with alignment. This leading edge (106) acts as a first aligning surface against the tube crimp (105) which further assists in aligning the taper portion (97) of the fingers (85) with the punched fin stack hold (75).

The present invention operates on clearances of from 0.002" to 0.004". The clearance for the hairpin tube (47) with respect to the punched hole (75) is approximately 0.001" to 0.003". The expansion of the fingers (85) caused by the operation of the expander tip (71) is approximately 0.002".

The above description is intended to be illustrative of the invention. Many changes can be made in the above-described embodiments without departing from the intent or scope of the invention. Some of these changes can present sever modifications to the present structure while producing the same operation or result as the present embodiment. These changes are intended to be incorporated as part of the present invention. The scope of the present invention, therefore, is to be defined by the claims appended hereinafter.

What is claimed is:

1. An apparatus for automatic hairpin lacing of heat exchanger hairpins through fin stack holes, comprising:

a first alignment jig for positioning a fin stack carrying a plurality of hairpin tube holes in a predetermined orientation and in alignment with a predetermined axis of movement;

a second alignment jig for positioning a matrix of hairpin tubes in an orientation for insertion through respective fin stack holes when a fin stack is held in said first alignment jig, said second alignment jig being removable to a first side of said first alignment jig;

a mounting block for holding a matrix of engaging devices in orientation for insertion through respective said fin stack holes, said mounting block being removable to a second side opposite said first side of said first alignment jig;

a plurality of engaging devices positioned to extend from said mounting block toward said first alignment jig to pass through said fin stack holes and to penetrate said hairpin tubes when said mounting block is moved to be immediately adjacent said first alignment jig;

a plurality of engagement activation devices, one carried by each engaging device, each said engagement activation device being selectively operable to activate the movement of said engaging device to engage said hairpin tube;

a first drive means for selectively moving said mounting block towards and away from said first alignment jig opposite side and thereby effecting the movement of said plurality of engaging devices; and a second drive means for selectively operating said plurality of activation devices to effect said hairpin engagement.

2. The apparatus of claim 1 wherein said second drive structure operation is regulated.

3. The apparatus of claim 2 wherein said engagement activation device is regulated.

4. The apparatus of claim 3 wherein said plurality of engaging devices each include alignment surfaces for interfacing with said fin stack holes and said hairpin tubes.

5. The apparatus of claim 4 wherein said plurality of engaging devices each include lead in alignment surfaces.

6. An apparatus for automatically pulling a heat exchanger tube through a hole in a stack of heat exchanger fins, comprising:

an extender tube mounted to an orientation structure;

a radially operative engagement structure positioned at the free end of said extender tube;

an engagement activator device operating with said extender tube to radially activate said engagement structure;

a self compensating alignment means operative on the lead in end of said engagement structure to ensure alignment with said fin stack hole and said heat exchanger tube opening;

a first drive means selectively operable to extend and retract said extender tube; and a second drive means selectively operable to operate said engagement activator device and thereby pull a said heat exchanger tube when said said extender tube is retracted by said first drive means while said engagement structure engages said heat exchanger tube under the operation of said second drive means.

7. The apparatus of claim 6 wherein:

said extender tube has a cylindrical bore;

said engagement structure is a plurality of radially positioned longitudinal fingers positioned at said free end of said extender tube;

said engagement activator device includes an expander rod operating longitudinally within said extender tube bore and a first camming structure positioned on said expander rod operating to expand radially said plural fingers;

said first drive means operates selectively also to extend said expander rod and said first camming structure; and said second drive means can selectively operate only said expander rod and said first camming structure.

8. The apparatus of claim 7 wherein said plurality of fingers includes a second camming structure for operating with said first camming structure to radially expand said plural fingers.

9. The apparatus of claim 8 wherein said camming structure extends beyond said plural fingers in the unexpanded state.

10. The apparatus of claim 9 wherein said camming structure is positioned within said extender tube bore in the unexpanded state.

11. The apparatus of claim 10 also including a structure for regulating the expansion of said plural fingers.

12. The apparatus of claim 11 also including a structure for regulating the operating force of said second drive means.

13. The apparatus of claim 12 wherein said extender tube includes a guide surface.

14. The apparatus of claim 13 wherein said plural fingers each include a lead guide surface.

* * * * *